UNITED STATES PATENT OFFICE.

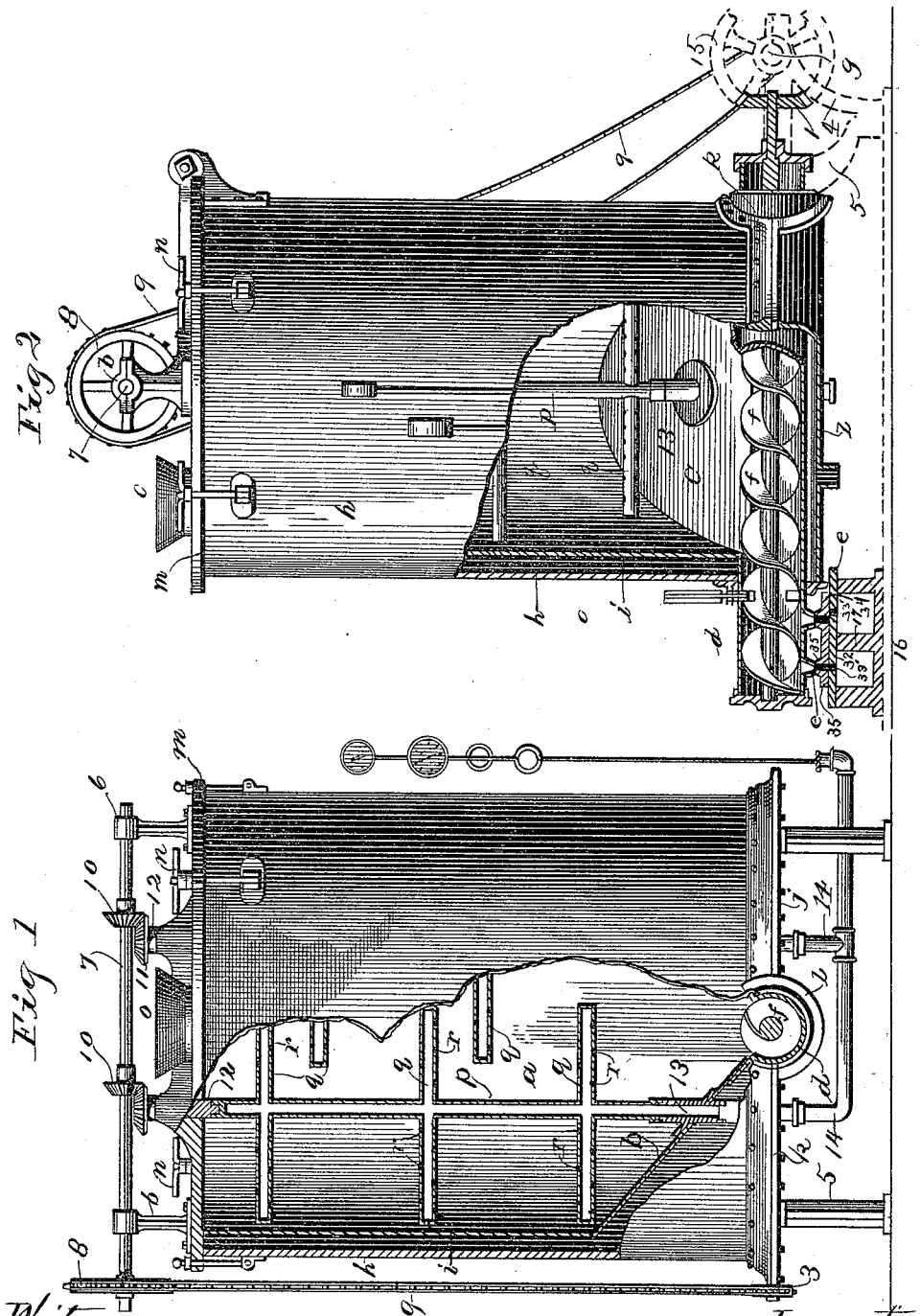

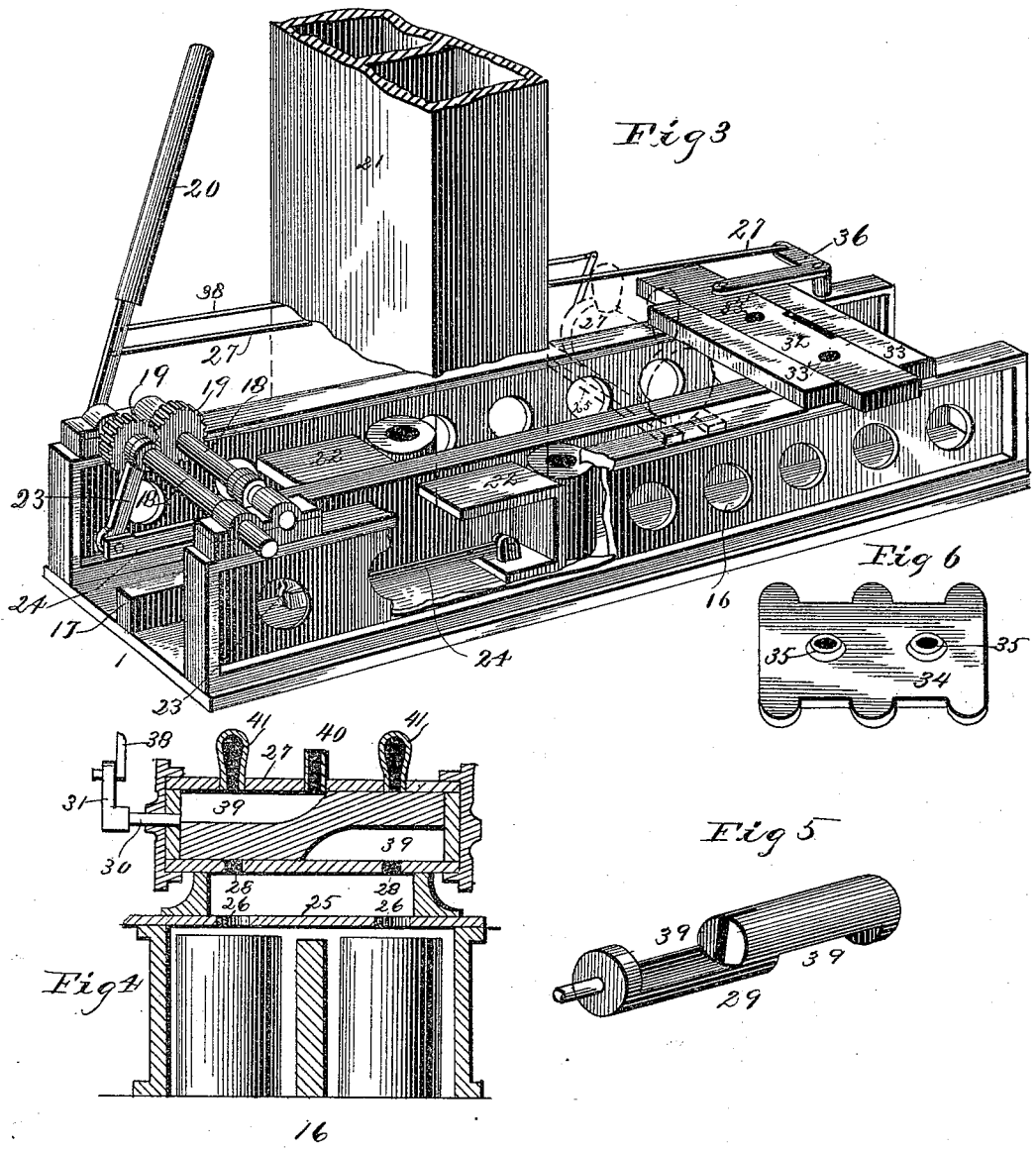

JOHN T. STAFF, OF KANSAS, ILLINOIS.

APPARATUS FOR CANNING CORN, &c.

SPECIFICATION forming part of Letters Patent No. 438,028, dated October 7, 1890.

Application filed March 5, 1890. Serial No. 342,733. (No model.)

*To all whom it may concern:*

Be it known that I, JOHN T. STAFF, a citizen of the United States, residing at Kansas, in the county of Edgar and State of Illinois, have invented certain new and useful Improvements in Apparatus for Cooking and Canning Cereals; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates to certain improvements in apparatus for cooking and canning corn or other grain, &c.

The invention consists in an improved method and in certain novel features of construction and in combinations of parts more fully described hereinafter, and particularly pointed out in the claims.

Referring to the accompanying drawings, Figure 1 is a side elevation of the machine, portions being broken away. Fig. 2 is an elevation, partially in section, at right angles to the preceding figure. Fig. 3 is a detail perspective of a part of the can-feeding mechanism, showing the liquid-feeder in dotted lines. Figs. 4 and 5 are respectively a section of the siruper or feeder and a perspective of its valve. Fig. 6 is a detail perspective of the valve-cover.

In the drawings, the reference-letter $a$ indicates an upright cooking-vessel, oval in cross-section, and having a double-inclined or V-shaped bottom formed by two oppositely-inclined plates $b\ c$, having a discharge-opening between their lower edges. A cylindrical feed trough or passage $d$ is horizontally located beneath the cooking-vessel, and has a longitudinal opening in its upper side registering with the discharge-opening between said plates. The front end of this cylinder $d$ projects beyond the side of the cooking-vessel, and on its under side is provided with one or more discharge-nozzles $e$. The opposite ends of said cylinder are closed by heads, as shown. A screw conveyer $f$ snugly fits in said cylinder to carry the contents thereof toward the front end of the cylinder. The conveyer-shaft is journaled in said cylinder-heads, and at its rear end said shaft is extended through the head and provided with a bevel-gear 1, meshing with a corresponding gear 15 on a horizontal drive-shaft $g$. The gear 15 is movable to throw the conveyer in or out of gear. This drive-shaft is provided with one or more driven pulleys and with a sprocket-pinion at one end, and is suitably and strongly mounted in brackets 4, from the standard 5, supporting the cooking-vessel.

The oval cooking-vessel is inclosed in a sheet-metal jacket $h$, of the same shape as the vessel and completely inclosing the same (except at the top) and forming a steam space or jacket $i$ around the cooking-vessel and beneath the inclined bottom plates thereof. This jacket is provided with a strong cast-iron bottom $j$, provided with an annular securing-flange $k$, and with a semi-cylindrical trough $l$ across its center and enveloping the lower half of the feed-cylinder, and the flange $k$ is arched to pass up around the projecting end of said feed-cylinder.

The cooking-vessel and the jacket around the same are provided with a strong metal lid or cover $m$, hinged at one edge to the jacket, and strongly and normally held down by screw-bolts hinged to the jacket to swing into or out of slots in the edge of the cover, and provided with nuts $n$ on their ends to clamp down on the upper face of the cover and hold the bolts in said slots. This cover is provided with a feed-hopper $o$.

A pair of vertical hollow shafts $p\ p$ extend the length of the cooking-vessel in the same plane with the axis of the greatest width thereof. These shafts are provided with series of oppositely-extending horizontal hollow arms $q$, having their interiors communicating with the interiors of the shafts and provided with steam-escape openings $r$ in their upper and lower sides. The arms on the two shafts are so arranged that as the shafts revolve the arms of one shaft will swing between those of the other.

The lid or cover is provided with horizontal bearings 6 on its upper side. A horizontal shaft 7 is journaled in these bearings and extends transversely across and beyond said lid, and at one end is provided with a sprocket-wheel 8, driven by and connected with the sprocket-pinion 3 by a sprocket-chain 9. This shaft 7 is provided with a pair of bevel-gears 10 10, meshing with and driving a pair of similar gears 11 11 on the upper ends of short vertical shafts 12 12, journaled in and extending through the cover and provided with squared ends removably fitting in corresponding sockets in the upper closed ends of the said hollow shafts, so as to drive said shafts and yet admit raising the lid without disturbing said hollow shafts. The lower open ends of said hollow shafts are mounted in the hollow bearings 13 13, secured to and extending through the inclined bottom plates *b c*, and at their lower ends connected with steam-supply pipes 14 14, provided with suitable shut-off valves and pressure-gages, as shown.

A horizontal elongated metal trough or bed 16 extends along beneath the projecting discharge end of the feed trough or case from the cooking-vessel. This bed 16 is longitudinally divided into two similar channels or ways by a longitudinal partition 17. These channels are each of such dimensions as to permit the easy passage of a row of cans. At the rear end of the bed 16 a pair of pillow-blocks or horizontal bearings are secured upon the edges of the can-feeding channels. A pair of parallel horizontal shafts 18 18 are mounted in said bearings, and these two shafts are provided with a pair of intermeshing gear-wheels 19 19, so that the shafts will rock together in opposite directions when one shaft is operated. One shaft is provided with an upwardly-extending rocking operating-lever 20, rigidly secured thereto, and this shaft can be extended to receive a power-pulley, if desired. Near the shafts the bed supports a vertical feed-magazine 21, provided with two chutes, each respectively opening into a feed-channel of the bed. The cans are placed in this magazine, and are fed therefrom into the horizontal feed-channels. In the feed-channels beneath the lower open ends of the two feed-chutes are located the sliding feed frames or boxes 22 22, each box being of such dimensions as to snugly fit in its respective feed-channel and snugly close and fit against the lower open end of its respective feed-chute, and of such length that when drawn back a can can drop into the channel in front of the feed box or frame. The shafts 18 are each provided with a downwardly-extending arm 23, loosely connected with one of said feed-frames by rod 24. Thus it will be seen that when the said lever is rocked it will rock said two shafts in opposite directions, and hence force one feed-slide forward beneath its feed-chute, pushing forward the row of cans in its horizontal feed-channel, while the feed-slide on the other feed-channel is drawn back, allowing a can from its feed-chute to drop into the feed-channel in front of it, and when the lever is forced in the opposite direction the movement of the feed-slides is reversed and the can on the opposite side is pushed forward.

A short distance from the can-feeding mechanism a horizontal plate 25 is secured across the can-guiding channels and is provided with a transverse opening 26 above each can-channel so located as to be above the top openings of the cans as they are fed forward beneath said plate 25. A horizontal cylinder 27 is supported by said plate by short legs or standards. This case or cylinder is provided on its lower side with two discharge-openings 28 28 directly above the openings 26 26. A rocking cylindrical-valve 29 fits snugly in this cylinder, and at one end is provided with the central shaft 30, projecting through a head of said cylindrical chest and provided with a crank-arm 31, loosely connected with the rocking operating-lever by a rod 38, so that said valve will be rocked by the operating-lever. The two opposite ends of this valve are each provided with a cup 39, the two cups being located diametrically opposite each other. These cups are formed by hollowing out the sides of said cylindrical valve at the ends thereof, and each cup is provided with a duct or conduit extending from its inner end toward the center of the periphery of the valve, so as to lie beneath the open end of the feed-pipe 40, opening into the center of the top of the casing. Air-domes 41 41 are located on the top of the casing, so as to be directly above the cups of the valve when turned up. Brine or other suitable liquid is fed through the feed-pipe and passes into and fills the cup turned up through its conduit. The operating-lever then rocks said valve, so that the filled cup is turned down and discharges its contents through one set of openings 28 26 into a can in the channel beneath. By the same movement the other cup is turned up to receive the brine, and by the next movement is turned down and discharges its contents into a can in the other channel. By rocking the main lever one cup is being filled while the other is being emptied. Brine or some similar liquid is passed into the siruper and from thence into the cans. This brine or other preservative liquid preserves the juice of the grain and prevents it from souring and fermenting.

The can feeding and filling mechanism can be operated by the hand-lever, or it can be operated by means of a suitable motor.

Beyond the siruper and directly beneath the discharge end of the feed-cylinder of the cooking-vessel a thin horizontal slide-valve 32 is located and slides between ways 33 33 upon the edges of the can-channels, so that the cans can pass beneath the slide. The slide is provided with two transverse discharge-openings 33' 33', so arranged as to be over the can-channels and that when one opening is registering with its discharge-nozzle *e* the other opening is out of alignment with nozzle *e*. This slide is provided with a cap or cover 34, fitted over the same and provided with transverse openings adapted to register with openings 33' and provided with raised bosses 35, registering with nozzles *e e*, thereby forming closed conduits to the open ends of the cans, and hence preventing any waste of corn, &c., during the passage to the cans. A horizontal bell-crank lever 36 to reciprocate said slide is mounted to a can-channel side and has one arm loosely connected to said slide to reciprocate the same, and has its opposite arm loosely connected to said rocking operating-lever by a rod 27.

In operation a constant flow of cut green corn is started through the hopper in the lid of the cooking-vessel until the same is nearly full. The stirrer-shafts are then started, thereby moving every grain and agitating the entire mass. The steam is then turned on and by means of the hollow stirrers is discharged throughout the entire cooking-vessel and permeates every part of the agitated mass therein. Steam also being allowed to enter the surrounding steam-jacket maintains a constant temperature throughout the vessel. The corn is thus partially cooked, all gases are liberated, and the juice and other desirable properties are fixed without discoloring the grain. The first batch or turn of corn is usually allowed to cook about ten minutes and the mechanism is started to discharge the cooked corn into the cans. After the first turn is cooked a constant feed of green corn and a constant discharge of cooked corn is maintained. To start the discharge of cooked corn into the cans, the rocking operating-lever is rocked in one direction, thereby pushing a can forward in one guide-channel and placing one in the other channel in position to be pushed forward. A line of cans is thus started along each channel. The second push of the lever places a can in one channel under a discharge-nozzle of the sirup-cylinder. By means of correctly-proportioned connecting-rods said cylinder is operated by the same stroke of the lever that pushes the can into position for receiving the required quantity of preserving-liquid from the siruper. The second push, after the can leaves the siruper places the can under a discharge-nozzle of the corn-feeding cylinder, and then by movement of the accurately-adjustable slide-valve said discharge-nozzle is opened long enough to allow the required amount of corn to flow into the can. When the can is filled, the flow of the corn is cut off, and the next movement of said lever pushes the can away and out at the discharge end of the channel. Of course after the cans have been filled they are suitably sealed and placed in condition for the market. The feed in this construction is arranged so that one row of cans is stationary and two cans are being filled, one with sirup and the other with corn, while the other row is being moved forward into position and vice versa. Thus a can in one channel or the other is being filled all the time. There should be a pressure of from ten to fifteen pounds in the cooking-vessel and from four to five in the jacket. A thermometer placed on the discharge end of the feed-cylinder of the cooking-vessel serves as a further test of the temperature of the corn.

It is evident that various changes might be resorted to in the form and arrangements of the parts described without departing from the spirit and scope of my invention. Hence, I do not limit myself to the exact construction herein set forth.

What I claim is—

1. An upright cooking-vessel having a V-shaped bottom open at its lower portion, in combination with a horizontal conveyer at said opening, a casing for the conveyer projecting at one end and provided with one or more discharge-nozzles on the lower side of said projecting-end, substantially as described.

2. An upright closed cooking-vessel having its bottom formed by two sides inclined downwardly and centrally with a discharge-space between their lower edges, in combination with a horizontal feed cylinder or trough located beneath said vessel with said discharge-opening above the opening of the trough, said trough being provided with one or more discharge-nozzles at one end, the conveyer in said trough, the hollow stirrer-shafts in said vessel, and means to drive said shafts and the conveyer.

3. The combination of the cooking-vessel, the can-feeding mechanism, and a conveyer to take the cooked material from said vessel and feed the same into the cans fed forward by said mechanism.

4. The combination, with the cooking-vessel having a discharge at its bottom and open at the top, of the cover or lid for said vessel provided with means for locking it down, a vertical rotary shaft in said vessel, a short vertical shaft journaled in and extending through the cover and removably fitting the upper end of said stirrer-shaft, and the horizontal shaft on the cover to drive said vertical shaft.

5. The combination of the upright cooking-vessel having a discharge-opening in its bottom opening into a feed casing or trough, a conveyer in said trough, one or more stirrer-shafts in the vessel, a horizontal shaft on top of the vessel having gearing to drive said stirrer or stirrers, and a drive-shaft connected with said conveyer and said horizontal shaft to drive the same.

6. The cooking-vessel having a lateral feed-cylinder having one or more discharge-nozzles on its under side, a slide-valve to regulate the discharge from said nozzle, a can-guiding channel extending along beneath said nozzle, and means to feed a line of cans along said channel.

7. The cooking-vessel having a discharge-nozzle, a valve to control the same, in combination with a can-guiding channel passing beneath said nozzle having a vertical can-feeding chute, and means to feed the cans along said channel from the chute and to operate said valve to discharge corn into the cans.

8. The cooking-vessel provided with the laterally-projecting trough having a discharge-nozzle in its bottom, in combination with the can-guiding channel beneath the nozzle, and the sliding valve and its cover resting on said channel and adapted to close and open the nozzle.

9. The can-guiding channel, in combination with the vertical can-feeding chute, a shaft, means to rock said shaft, and a can-feeding box or slide in the channel connected with said shaft and adapted to force the cans along the channel and allow the cans to drop from said chute.

10. The bed or frame divided into two separate longitudinal can-guiding channels, in combination with a vertical can-feeding magazine having two chutes opening, respectively, into said channels, a pair of shafts mounted on said bed and connected by gearing to cause the shafts to rotate in opposite directions, and a slide or box in each channel beneath each feed-chute and each connected to a different one of said shafts to push the cans forward in said channels and allow the cans to separately drop from the chutes into the channels in front of said slides.

11. A canning apparatus consisting in the combination of a cooking-vessel having a discharge-opening, a siruper or liquid-feeding valve, a can-feeding mechanism, and means to operate simultaneously said valve and discharge to discharge liquid and corn into each can when passed along by the feeding mechanism, substantially as described.

12. The combination, in a canning-machine, of a cooking-vessel having a lateral discharge, a liquid-feeding vessel or valve, a can-guiding channel passing beneath said valve and discharge mechanism to intermittingly feed a row of cans along said channel, and connections to operate said valve and discharge to discharge grain and liquid into the cans when they stop, substantially as described.

13. The combination, with the can-guiding channel, of a slide feed-valve thereon controlling the discharge of the cooked material into the cans, a liquid-feeding valve above said channel, and a lever connected with said two valves to operate the same simultaneously as the row of cans intermittingly fed along said channel stops beneath said valves.

14. The combination, with the cooked-grain feeder and the preservative-liquid feeder, of the can-guiding channel extending beneath said feeders, a can-feeding slide in the channel, and a rocking lever connecting with said grain and liquid feeders and with said slide to operate the same.

15. The cooking-vessel having a projecting discharge-nozzle, in combination with the can-guiding channel beneath said nozzle, a plate having a transverse aperture registering with said nozzle and having a boss engaging the same, and the slide-valve beneath said plate having a transverse opening to register with said opening and the open end of the can.

16. The herein-described liquid-feeder, consisting of the cylindrical casing having a feed-pipe opening into its upper side and two discharge-openings from its lower side, and the rotary cylindrical valve in said cylinder having cups in its ends to alternately be filled from the feed-pipe and discharge at its discharge-opening.

17. The combination of the upright cooking-vessel provided with the V-shaped bottom having the discharge-opening at its lowest portion, the removable cover for said vessel, the steam-jacket surrounding said chamber and located beneath the bottom thereof, the two hollow stirrer-shafts extending through said vessel and at their lower ends journaled in hollow bearings in opposite sides of said bottom, short driving-shafts in said cover removably fitting the upper ends of said stirrer-shafts, and the hollow lateral perforated stirrer-arms from said stirrer-shafts within said vessel.

18. In combination, the upright closed cooking-vessel having the horizontal discharge-trough in its bottom, the steam-jacket surrounding said vessel and located beneath the bottom and discharge-trough thereof, the hollow bearings in the bottom of said vessel connected with a steam-supply, the hollow vertical shafts at their lower ends mounted in said bearings and at their upper ends closed and connected with driving-shafts, and the horizontal hollow perforated stirrer-arms extending from said shafts to stir and discharge steam throughout the grain in said vessel, the arms on the different shafts being arranged to pass each other, as set forth.

19. In combination, a guideway or channel, a closed cylinder mounted on and above the same and provided with a discharge-port in its under side above said channel, a liquid-supply pipe opening into the upper side of said cylinder, and a rotary valve in said cylinder having a cup in one side to alternately register with said inlet and said outlet, and provided with means for rocking the valve, as set forth.

In testimony that I claim the foregoing as my own I affix my signature in presence of two witnesses.

JOHN T. STAFF.

Witnesses:
JOHN C. ROBINSON,
GEO. M. DAVIS.